US007765580B2

United States Patent
Vandergeest et al.

(10) Patent No.: US 7,765,580 B2
(45) Date of Patent: Jul. 27, 2010

(54) METHOD AND APPARATUS FOR PROVIDING USER AUTHENTICATION USING A BACK CHANNEL

(75) Inventors: Ron J. Vandergeest, Ottawa (CA); Kevin T. Simzer, Garland, TX (US); Eric R. Skinner, Ottawa (CA)

(73) Assignee: Entrust, Inc., Dallas, TX (US)

( * ) Notice: Subject to any disclaimer, the term of this patent is extended or adjusted under 35 U.S.C. 154(b) by 1669 days.

(21) Appl. No.: 09/855,183

(22) Filed: May 14, 2001

(65) Prior Publication Data

US 2002/0169988 A1 Nov. 14, 2002

Related U.S. Application Data

(63) Continuation-in-part of application No. 09/747,770, filed on Dec. 22, 2000, now abandoned.

(51) Int. Cl.
*H04L 9/00* (2006.01)
(52) U.S. Cl. ......................................................... 726/2
(58) Field of Classification Search ......... 713/200–202, 713/154–155, 161, 168, 176, 180, 183, 170; 705/53, 67, 72, 75, 77–78, 7; 370/312, 329, 370/335, 341, 351; 380/229, 232, 241, 33, 380/34, 270, 272; 709/200, 202–203, 225, 709/238; 725/27, 30, 54, 62–63, 81; 726/12, 726/15, 17, 2–5, 21, 27–29; 348/14.02; 455/3.01–3.04, 455/132
See application file for complete search history.

(56) References Cited

U.S. PATENT DOCUMENTS

| 4,268,715 | A | * | 5/1981 | Atalla ........................... 705/75 |
| 4,817,140 | A | | 3/1989 | Chandra et al. |
| 5,142,578 | A | | 8/1992 | Matyas et al. |
| 5,241,594 | A | | 8/1993 | Kung |
| 5,280,581 | A | | 1/1994 | Bathrick et al. |
| 5,299,263 | A | | 3/1994 | Beller et al. |
| 5,604,801 | A | | 2/1997 | Dolan et al. |
| 5,673,318 | A | | 9/1997 | Bellare et al. |

(Continued)

FOREIGN PATENT DOCUMENTS

EP 1364508 B1 6/2006

OTHER PUBLICATIONS

Vandergeest, Ron J. et al.; U.S. Co-Pending U.S. Appl. No. 09/747,770, filed Dec. 22, 2000.

*Primary Examiner*—Kimyen Vu
*Assistant Examiner*—Leynna T Truvan
(74) *Attorney, Agent, or Firm*—Vedder Price P.C.

(57) ABSTRACT

A method and apparatus provides user authentication by communicating primary authentication information, such as user identification data and/or password data to an authentication unit via a primary channel such as over the Internet. An authentication code is generated by the authentication unit on a per session basis and is sent to a destination unit via a first secondary channel during the session. The destination unit then retransmits the authentication code, on a second secondary channel, to the first unit in a way that is transparent to a user of the first unit. The first device then send the received re-transmitted authentication code back to the authentication unit via the primary channel during the session.

11 Claims, 6 Drawing Sheets

U.S. PATENT DOCUMENTS

| | | | |
|---|---|---|---|
| 5,745,879 A | 4/1998 | Wyman | |
| 5,875,296 A | 2/1999 | Shi et al. | |
| 5,944,794 A * | 8/1999 | Okamoto et al. | 709/225 |
| 6,052,725 A | 4/2000 | McCann et al. | |
| 6,061,448 A | 5/2000 | Smith et al. | |
| 6,078,908 A * | 6/2000 | Schmitz | 705/50 |
| 6,161,185 A * | 12/2000 | Guthrie et al. | 726/5 |
| 6,209,091 B1 | 3/2001 | Sudia et al. | |
| 6,256,741 B1 | 7/2001 | Stubblebine | |
| 6,275,936 B1 | 8/2001 | Kyojima et al. | |
| 6,338,138 B1 * | 1/2002 | Raduchel et al. | 713/155 |
| 6,339,830 B1 * | 1/2002 | See et al. | 726/15 |
| 6,384,310 B2 * | 5/2002 | Aoki et al. | 84/609 |
| 6,424,249 B1 * | 7/2002 | Houvener | 340/5.82 |
| 6,510,236 B1 | 1/2003 | Crane et al. | |
| 6,529,706 B1 * | 3/2003 | Mitchell | 455/12.1 |
| 6,600,902 B1 * | 7/2003 | Bell | 455/41.2 |
| 6,609,206 B1 * | 8/2003 | Veneklase | 726/7 |
| 6,643,774 B1 | 11/2003 | McGarvey | |
| 6,651,168 B1 | 11/2003 | Kao et al. | |
| 6,694,025 B1 | 2/2004 | Epstein et al. | |
| 6,738,635 B1 | 5/2004 | Lewis et al. | |
| 6,751,733 B1 * | 6/2004 | Nakamura et al. | 713/182 |
| 6,766,454 B1 * | 7/2004 | Riggins | 713/185 |
| 6,785,716 B1 * | 8/2004 | Nobakht | 709/219 |
| 6,789,122 B1 * | 9/2004 | Slaughter et al. | 709/229 |
| 6,813,726 B2 * | 11/2004 | Dahlen et al. | 714/6 |
| 6,823,055 B1 * | 11/2004 | Mayer et al. | 379/201.05 |
| 6,862,583 B1 | 3/2005 | Mazzagatte et al. | |
| 6,885,388 B2 | 4/2005 | Gunter et al. | |
| 6,907,530 B2 * | 6/2005 | Wang | 726/12 |
| 6,937,726 B1 | 8/2005 | Wang | |
| 6,941,472 B2 | 9/2005 | Moriconi et al. | |
| 6,954,817 B2 * | 10/2005 | Brooks et al. | 710/306 |
| 6,976,009 B2 | 12/2005 | Tadayon et al. | |
| 6,980,817 B1 * | 12/2005 | Chow et al. | 455/461 |
| 6,983,366 B1 * | 1/2006 | Huynh et al. | 713/168 |
| 7,006,455 B1 * | 2/2006 | Fandrianto et al. | 370/260 |
| 7,009,940 B2 * | 3/2006 | Vialen et al. | 370/252 |
| 7,020,773 B1 * | 3/2006 | Otway et al. | 713/171 |
| 7,020,781 B1 | 3/2006 | Saw et al. | |
| 7,058,696 B1 | 6/2006 | Phillips et al. | |
| 7,068,676 B1 * | 6/2006 | Sugaya et al. | 370/445 |
| 7,073,195 B2 | 7/2006 | Brickell et al. | |
| 7,089,321 B2 | 8/2006 | Hayashi | |
| 7,089,585 B1 * | 8/2006 | Dharmarajan | 726/8 |
| 7,093,015 B2 * | 8/2006 | Gubbi et al. | 709/225 |
| 7,110,744 B2 * | 9/2006 | Freeny, Jr. | 455/406 |
| 7,136,903 B1 | 11/2006 | Phillips et al. | |
| 7,171,687 B2 | 1/2007 | Uemura | |
| 7,209,903 B1 * | 4/2007 | Mamdani et al. | 705/75 |
| 7,218,630 B1 | 5/2007 | Rahman | |
| 7,240,060 B2 | 7/2007 | Adya et al. | |
| 2002/0169988 A1 | 11/2002 | Vandergeest et al. | |

* cited by examiner

METHOD AND APPARATUS FOR PROVIDING USER AUTHENTICATION USING A BACK CHANNEL

RELATED CO-PENDING APPLICATION

This is a continuation in part of application entitled "Method and Apparatus for Providing User Authentication" filed on Dec. 22, 2000, having Ser. No. 09/747,770 now abandoned, inventors Vandergeest et al., incorporated herein by reference and owned by instant assignee.

FIELD OF THE INVENTION

The invention relates generally to methods and apparatus for providing user authentication to allow a user to gain access to an application(s) or system, and more particularly to methods and apparatus for providing user authentication using multi-factor authentication techniques.

BACKGROUND OF THE INVENTION

Many secure access techniques are known to gain access to secure computer systems, bank accounts, and other processes within a computer or Internet appliance. For example, communication units include Web browsers that may be used to gain access to Web-based information from a Web server and may be coupled via a wireless or non-wireless communication link. Techniques are known to provide per session based authentication between, for example, a user device (i.e., such as a personal computer (PC), Internet appliance, laptop computer, smart card, radio telephone, or any other suitable device) and external system, such as a Web service on the Internet, or to processes within the same device. Cryptographic engines are often used to provide public key-based encryption, decryption, digital signing and signature verification as known in the art, and in such systems public and private key pairs are periodically generated and allow a user to digitally sign information, or decrypt information using private keys.

Session-based single factor authentication techniques are known wherein, for example, a first unit, such as a user device, is asked by a server which may contain, for example, credit card accounts, bank accounts or any other secure information, for the user to enter a user ID and a password to send so that the server can trust the user device. However, some such systems can be vulnerable to attack. For example, an attacker that maliciously obtains a user password can thereafter impersonate that user. Two factor authentication adds another level of security. For example, a server may return an authentication code, such as a random number generated by a random number generator in the server to the user device after the user entered the correct user ID and password. The user device receives and digitally signs the received authentication code using a private signature key located on a smartcard that has been inserted into a smartcard reader at the user device, and returns the digitally signed authentication code over a same channel that was used to originally send the generated authentication code. However, deployment of such schemes is limited based at least on the monetary expense of supporting card readers at user devices.

Other two-factor authentication schemes are known, which do not require a hardware reader at the user device. For example, systems may use smart cards with display screens thereon in the following manner. The user is assigned a user ID and may select a personal identification number to be used as a password. A software routine running in a server such as a Web server or other suitable server, executes a similar routine executed by the smart card to generate a random number (authentication code) every few minutes. Although the smart card randomly generates a number every few minutes and the server randomly generates a random number every few minutes, these devices are typically not in communication with one another. These are two stand alone devices typically. When a user wishes to gain access to the server, the user uses the smart card by entering a PIN into the smart card. If the PIN is accepted, the smart card then displays the random number that it generates on the display device. At the same time the server generates a random number based on the same algorithm so that the numbers are identical. The user then manually enters the displayed number in a keypad or other input device that is coupled to the server. The randomly generated number serves as a second level or second factor authentication code. However, because the two devices are not in communication and suitably synchronized, the server typically allows for a user to use a displayed random number that has previously been displayed as an acceptable number. In other words, there is a window during which time a server will accept more than one random number generated by the smart card. Accordingly, a problem can arise since an unscrupulous party may obtain the displayed number and still gain access to the system since the smart card and server are typically not in communication during a session, and multiple authentication codes can be used to gain access to the system.

Other two factor authentication techniques are known. For example, in some systems, a user is given a user ID and password and is e-mailed authentication information in an out of band communication, such that it is not sent during a session, to allow a user to enroll in a given system. However, the out of band authentication code could be intercepted and is not directly tied into a particular session.

Moreover, information security systems are being developed to allow a user to roam from one device to another. For example, a user profile that includes, for example, private keys such as private decryption keys and private signing keys along with user password information and other cryptographic keys, may be encrypted and stored in a server that is accessible by a user using a plurality of devices. The user profile is then sent to a user but only after an authentication procedure is carried out. Such authentication procedures may typically involve a user using a Web browser through which a user ID and password is entered. However, no other user-specific credentials are typically necessary. As a result, an unscrupulous party may gain access a user's private keys if they are able to obtain a user ID and password such as overlooking a user while a user is entering the information on a keyboard.

Accordingly, there exists a need for an improved authentication method and apparatus that overcomes one or more of the above deficiencies.

DETAILED DESCRIPTION OF THE PREFERRED EMBODIMENT

Briefly, a method and apparatus provides user authentication by communicating primary authentication information, such as user identification data and/or password data to an authentication unit via a primary channel such as over the Internet. An authentication code is first generated by the authentication unit on a per session basis and is sent to the first device via an alternate or secondary channel during the session. The authentication unit determines which intermediate destination unit will receive the generated authentication code. As used herein, a unit may include multiple communication functions such as a telephone function, email function, pager function or any other suitable functions such that one Internet appliance, laptop computer or other unit may use one function to communicate on the primary channel, and another function on the alternate channel.

For example, where a user has a laptop computer being used as a first unit, and also has a pager or radiotelephone, as a third unit, that the user typically carries on his/her person, the authentication unit will use the primary authentication information that was sent by the first unit to determine which device to send the generated authentication code to based on, for example, the user ID sent as the primary authentication information. Accordingly, in one embodiment, an authentication database is maintained which contains per-user destination unit data, including, for example, a destination unit identifier such as a phone number of a radiotelephone, an IP address, a pager number, or any other suitable intermediate destination unit identifier which the authentication unit can use to contact and send the authentication code.

A user, for example, that has a pager as a third unit is sent the authentication code on their pager. The intermediate unit then retransmits the authentication code via a short range wireless transmitter to the first unit. The laptop then, transparent to the user, resends the retransmitted authentication code back to the authentication unit via the primary channel used to originally send the primary authentication information, during the same session. Since the first unit, such as the laptop computer, and the second unit, such as a Web server, or any other unit that has access to an authentication unit, are in communication during the session, the authentication information that is also sent during the same session via an alternate channel is the only authentication code allowed to authenticate a user during a given session. Moreover, another device (a third unit), other than the device originally sending the primary authentication information, is sent the authentication code. The first and third units transparently provide the authentication code to the second unit. A user must have access to the third unit and the first unit to complete the authentication process.

The secondary authentication information is typically an authentication code generated on a per session basis. This may include, for example, a pseudo random number or other suitable information. The authentication unit searches the database based on, for example, the sent user ID, to determine the telephone number of a radiotelephone or pager number associated with the user requesting authentication. The authentication code is sent to the designated unit via a wireless back channel during the session. The authenticator then determines whether the returned authentication code received from the wireless primary channel matches the sent authentication code that was sent on the wireless back channel to the third device.

Figure 1:
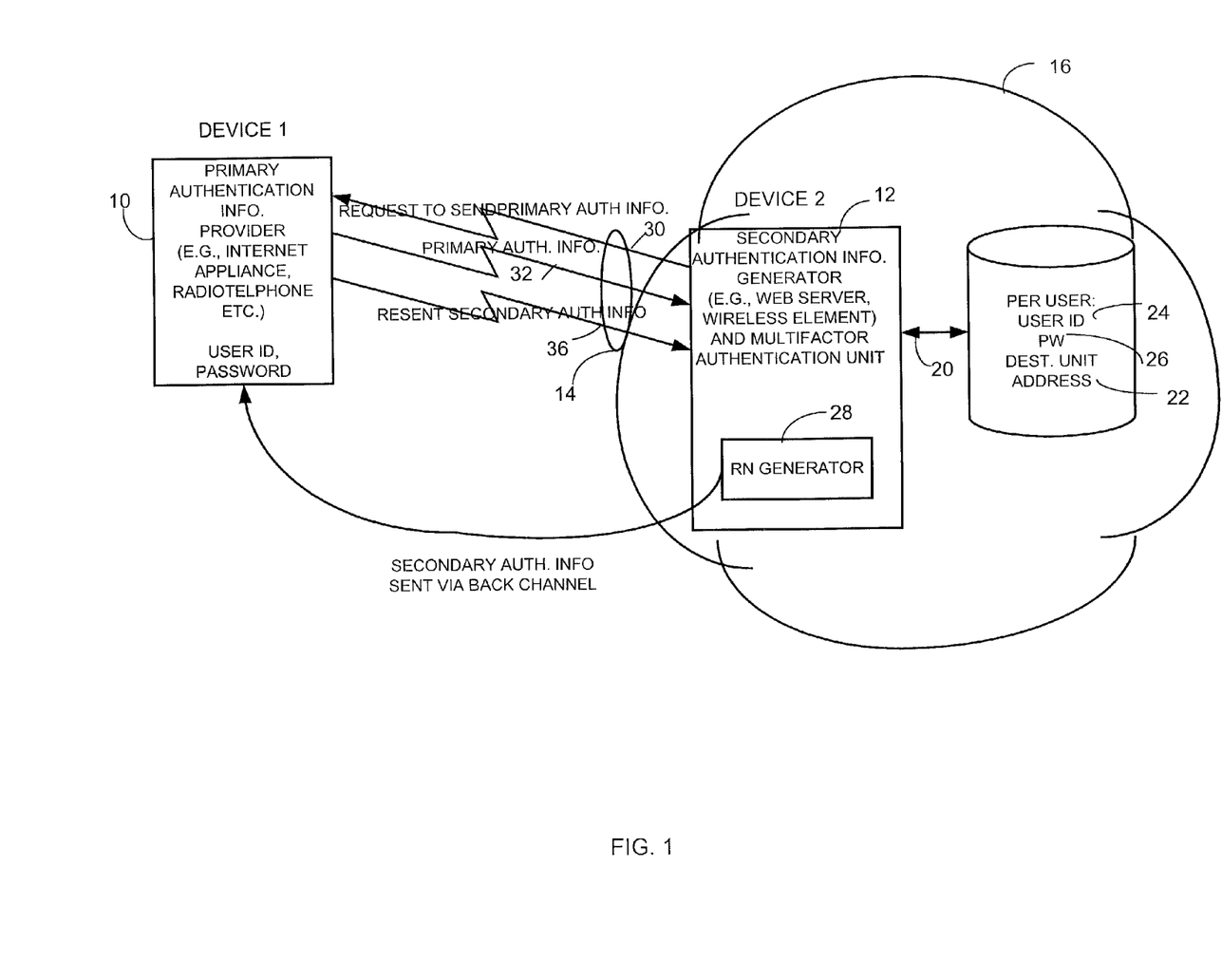
FIG. 1 is a block diagram illustrating one example of an apparatus for providing user authentication in accordance with one embodiment of the invention.

FIG. 1 illustrates one example of a system for providing user authentication that employs a first unit 10 and a second unit 12. The first unit 10 may be, for example, an Internet appliance, radiotelephone, PDA, laptop computer or any other suitable device that provides primary authentication information, such as user ID information and/or a password, such as a personal identification number, to the second unit 12. The second unit 12 may be any suitable device including, but not limited to, a Web server, wireless network element, laptop computer, radiotelephone, Internet appliance, or any other suitable device. The system is shown, for purposes of illustration and not limitation, to be a system that employs the Internet. The first unit 10 and second unit 12 are operatively coupled via primary channel 14, such as a wired or wireless communication link. The first unit 10 may include, for example, a Web browser or any other suitable interface to allow the exchange of information with another device on the Internet. The second unit 12 is a Web server within the Internet 16, but may be any suitable device in any suitable system. The second unit 12, in this embodiment, also serves as an authentication unit to authenticate a user. As used herein, the word "user" includes a person and/or the first unit 10. The system also includes an authentication database 18 that is operatively coupled to the second unit 12 via a suitable link 20. The authentication database 18 contains destination unit data 22 on a per user basis. Accordingly, the authentication database 18 stores, for a plurality of users, on a per-user basis, a user ID 24, associated password or hashed password 26 (if used) and destination unit data 22. The authentication database 18 may be populated based on a registration process carried out between a user device and the second unit 12. The second unit 12 also includes an authentication code generator 28 such as a random number generator to generate secondary authentication information that is sent back for use by the first unit 10.

During an authentication session, the second unit 12 sends a request 30 via primary channel 14 to the first unit 10 to request that the first unit send the user ID and password, where a password is used, to gain access to a desired system, software application or other process. During this session, the first unit 10 responds by sending the primary authentication information 32, namely, the user ID and password (if required). This may be provided, for example, by a person through an input device, such as a keypad. It may be a biometric input device, may be a hardware token, smart card or other suitable mechanism.

Figure 2:
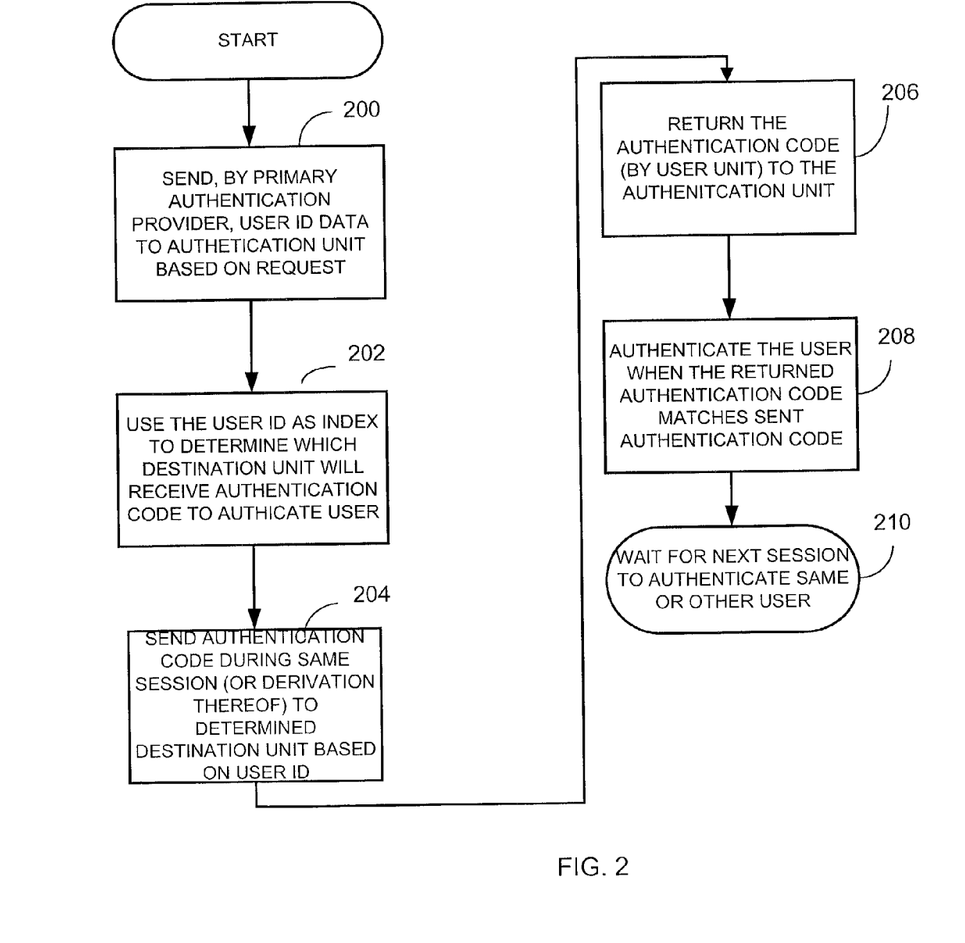
FIG. 2 is a flow chart illustrating one example of a method for providing user authentication in accordance with one embodiment of the invention.

Referring also to FIG. 2, the operation of the system shown in FIG. 1 will be explained. During a registration process, a user registers with the authentication unit. The authentication unit creates a database entry for each user (or user device) that contains a user ID field, a password verification field (if used, or a one-way hash of the password) and a device address field. As shown in block 200, a method for providing user authentication includes sending, by the first unit 10, user identification data, such as the user ID on the primary channel 14 to the second device 12 which also serves, in this embodiment, as an authentication unit. Since the authentication database 18 is previously populated based on a registration process, the second unit 12 uses the received user identification data 32, to determine which destination unit will receive a generated authenticated code that is generated on an authentication session basis to be used as a second level of authentication to authenticate a user. For example, a user may have multiple destination units such as a radiotelephone, pager, or multiple PDAs to which the user wishes to have the authentication code sent. Also, the user may designate that the first unit 10 be the destination unit in which case the authentication code, also referred to herein as the secondary authentication information, is sent to the first unit 10 as opposed to a unit other than the first unit. This is done by searching the authentication database 18 as indexed by the received user ID from the primary authentication information sent by the first unit 10. The second unit 12 matches the received user ID and if a password is used the associated hashed password, that was previously stored during the registration process to determine the appropriate destination unit identifier. The received password may be hashed and compared to the stored hash password. If there is a correlation, then the primary authentication is said to have succeeded, and the secondary authentication process may proceed using the destination unit identifier. One example of a destination unit identifier may be, for example, a telephone number associated with a given radiotelephone or other device that includes a radiotelephone, an IP address, that may be used, for example, to identify a pager or other device to which the authentication code is to be sent. Accordingly, as shown in block 202, the method includes using the user ID as an index to determine which destination unit will receive the authentication code generated by the authentication code generator 28 to authenticate a user. This is done based on the destination address 22 (from the device address field). As shown in block 204, the method includes sending the authentication code generated by the authentication code generator 28, such as a random number, or a derivation of the authentication code, during the same session to the determined destination unit that was determined based on the user ID and the destination address 22. In this embodiment, the destination unit is the first unit 10. As such, the destination unit address 22 may be an e-mail address or other suitable destination to which the second unit 12 will send the secondary authentication information, namely the generated authentication code. The authentication code that was generated by device 2 is sent during the same session via an alternate channel 34.

A shown in block 206, the method includes returning the received authentication code that was sent via an alternate channel, to the second unit, as shown by resent secondary authentication information 36. The authentication code may be suitably encrypted or hashed or any other suitable representation may be sent back to the second unit 12. As shown in block 208, the method includes authenticating, by the second unit 12, the user (or user device) when the return authentication code or the resent secondary authentication information 36 matches the sent authentication code that was sent via the alternate channel 34. For example, the second unit 12 may store the generated authentication code from the authentication code generator 28 during the session and compare the resent authentication code 36 to the stored authentication code. If they match, the user is authenticated. As shown in block 210, the method includes waiting for a next session to authenticate the same or another user.

In a preferred embodiment, the first device 10 includes a cryptographic engine that provides requisite components of a public key infrastructure to allow the digital signing and verification of data as well as the encryption and decryption of information. Likewise, the second unit 12 includes one or more corresponding cryptographic engines that allow for digitally signing verification of digital signatures, encryption/decryption of information, or any other suitable operations as necessary. The above operations may be carried out by one or more processing units under software control. Alternatively, integrated circuits may also provide the requisite operations. Accordingly, the apparatus of FIGS. 1 and 2 may be implemented via hardware, software, or any other suitable combination thereof.

The second unit 12 sends the authentication code generated by the authentication code generator 28 to the determined destination unit based on the stored per-user destination unit identifier 22. Each user may have more than one destination unit address if, for example, a user has a pager, cell phone, or Internet appliance and may designate by a priority factor, which of the destination unit addresses is used as the primary address. Accordingly, if a person carries with them numerous devices, one device is the highest priority device and is first used to receive the secondary authentication information. The second unit 12 may then wait for the resent secondary authentication information 36 to be received within a defined period of time. If the resent authentication code is not received, another or same authentication code may be sent to the next device of the next priority level as defined by the destination unit address after some predetermined amount of time has elapsed.

The method may also include receiving user input in response to the second unit sending the authentication code. For example, where the authentication code is sent via the alternate channel to the first device, the first device uses a graphic user interface to allow the user to input the authentication code and as such may activate a GUI button which then causes the authentication information to be resent back to the second device. Accordingly, the second device may wait to return the authentication code to the authentication unit 12 until receipt of the user input (e.g., entry of the authentication code).

In an alternative embodiment, the method may include, prior to returning the authentication code to the authentication unit, having the first unit digitally sign the received authentication code using a public key cryptographic engine prior to resending it back to the second unit. Digitally signing the received authentication code received via the back channel produces a digitally signed authentication code. Where the authentication code as resent is digitally signed, the second unit 12 verifies the digitally signed authentication code as part of the authenticating process by, for example, using conventional public key infrastructure techniques, as known in the art, to verify digital signatures.

Figure 3:
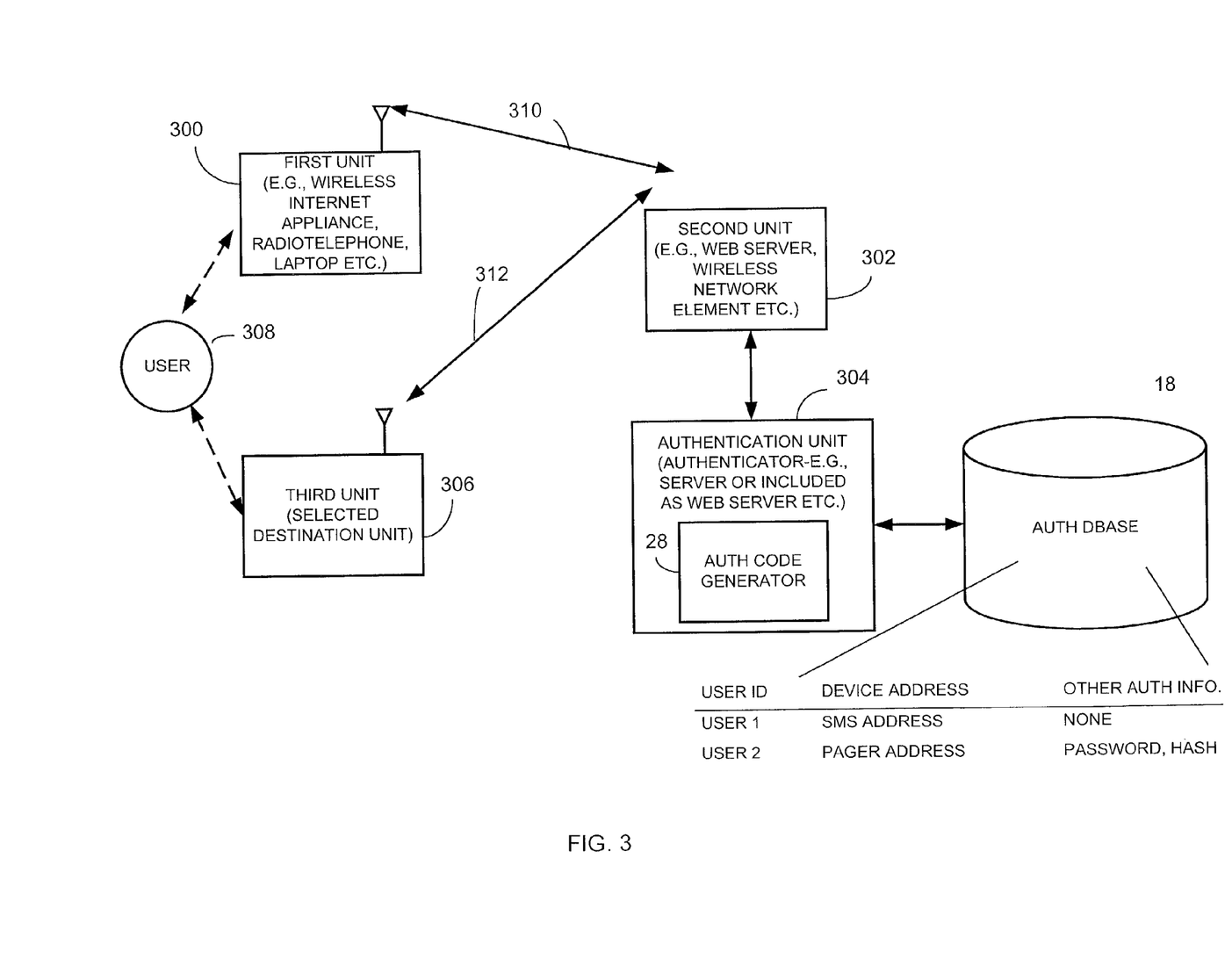
FIG. 3 is a block diagram illustrating a system for providing user authentication utilizing a wireless primary channel and back channel during a same session, in accordance with one embodiment of the invention.
Figure 4:
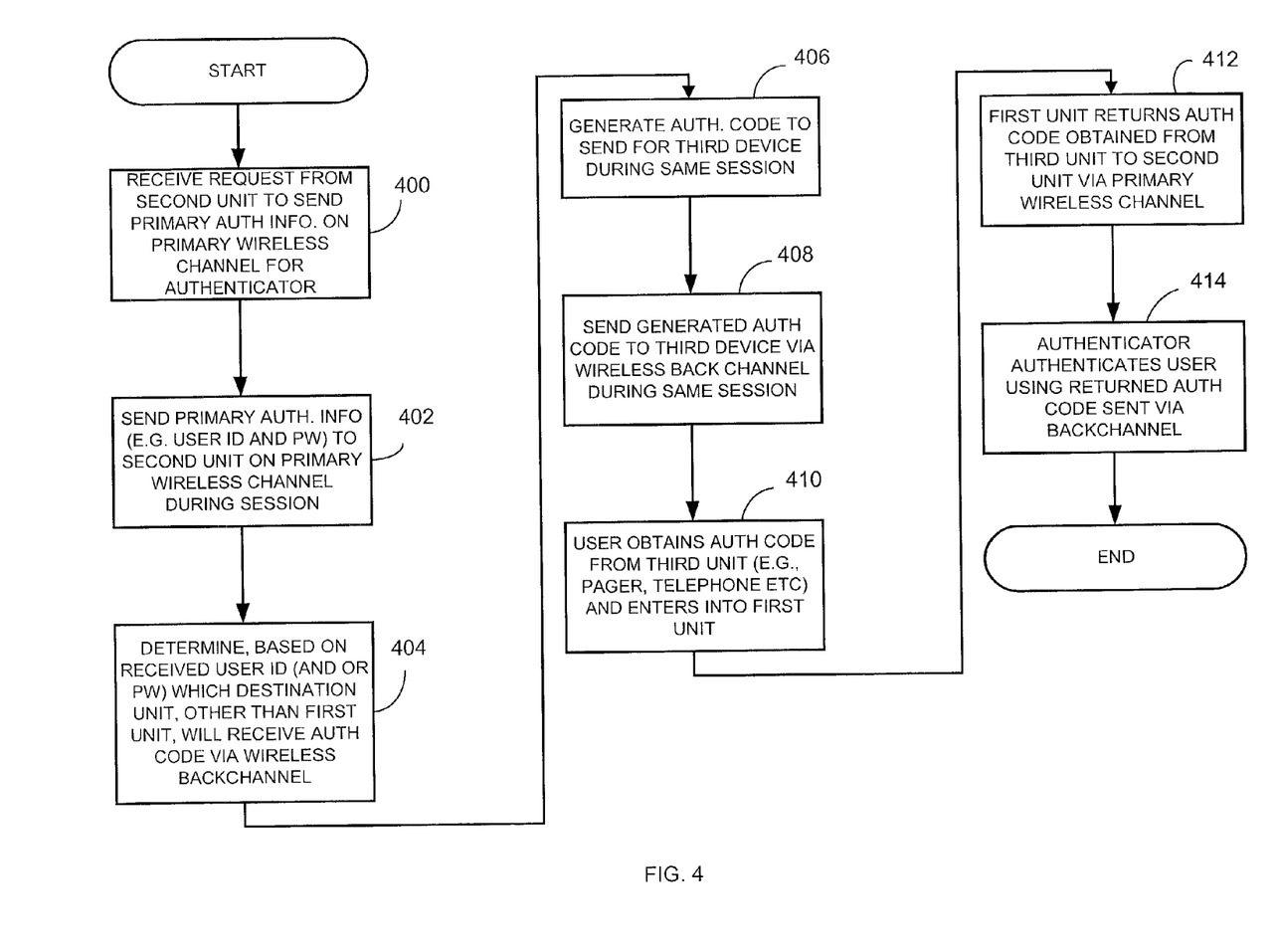
FIG. 4 is a flow chart illustrating one example of a method for providing user authentication in accordance with one embodiment of the invention.

Referring to FIGS. 3 and 4, an alternative embodiment is shown wherein the destination unit, other than the first unit, is used to receive generated authentication code. In addition, this embodiment shows a wireless communication system, such as a cellular Groupe Mobile Speciale (GSM) type system that employs, for example, a short messaging service (SMS) that provides, for example, text messaging via an alternate channel.

FIG. 3 illustrates a first unit 300, a second unit 302, an authenticator or authentication unit 304, the authentication database 18 and a third unit 306. In this embodiment, the authentication unit 304 is shown as being separate from the second unit 302. However, the authentication unit may be part of the second unit 302 which may be a Web server, wireless network element, or any other suitable device (as was shown in FIG. 1). The user 308, in this embodiment, may be, for example, a person. The first unit 300 and the second unit 302 are wireless devices that communicate over a primary wireless channel 310. The third unit 306 is also a wireless device, such as a pager, cell phone, PDA or other device that communicates with the second unit 302 over a wireless back channel 312, such as an SMS channel or other suitable channel.

The first unit 300 includes a primary channel controller, for example, a TCP/IP protocol stack used to communicate over the Internet to the second unit 302. The third unit 306 is preferably the personal property of the user 308, not a public device. As with the embodiment of FIGS. 1-2, the user 308, in a prior registration step, provides the destination unit identifier for each destination unit. In this example, one destination unit, namely the third unit 306, has been designated by a destination unit identifier 22. This identifier provides sufficient information in order to allow the third unit 306 to be communicated to from the second unit 302. This information is stored in the authentication database 18 and is available to the second unit 302, for example, through the authentication unit 304. The operation is similar to that previously described with reference to FIGS. 1 and 2, except in this embodiment, the generated authentication code as generated by the authentication code generator 28 in the second unit or in the authentication unit, is sent via a wireless alternate channel 312 to a unit other than the first unit 300. The authentication code is then provided to the user 308 via an audible or visual display associated with the third unit. The user through the user interface on the first unit, then inputs the authentication code into the first unit. The authentication code is then resent by the first unit to the second unit via the primary channel 310. The second unit 302 passes the resent authentication code to the authentication unit 304 where the authentication unit 304 compares the resent authentication code with the authentication code that was sent to the third unit 306. If they match, the user (i.e. first unit) is granted access.

Also during the registration process, other users, such as user 2 also register with the authentication unit. As such, the authentication database 18 includes user ID data 24, destination unit identifiers 22 and other authentication information such as whether a password is necessary for a plurality of users. In this example, user 2 has an authentication requirement that a password be used in addition to user ID 24. Accordingly, the authentication unit 304 uses the user identification data to determine, for example, which destination unit, other than the first unit 300, will receive authentication code generated on an authentication session basis, via the alternate channel 312 to be used to authenticate the user. If the user ID is for user 2, the authentication unit will inform the second unit 302 of the pager address associated with user 2 indicating the destination unit ID for user 2. Accordingly, user 2's pager will be sent the generated authentication code. If the user ID is the user ID for user 1, the destination unit identifier is an SMS address such as a short message service address used, for example, in a GSM cellular system. Accordingly, a radiotelephone unit associated with user 1 is contacted via an SMS channel during the session and is provided the authentication code via the back channel 312.

FIG. 4 illustrates one example for providing user authentication that may be implemented, for example, via the system shown in FIG. 3. However, it will be recognized that the disclosed methods herein can be carried out using any suitable structures and units and that the order of the steps may also be varied, if desired. In the above embodiments, a user wishes to access a resource controlled, for example, by the second unit via the first unit. Authentication is improved through the use of the alternate channel, through which authentication information is sent to a third device with a known address. The authentication information, such as the authentication code, is fed back through the primary channel to the second device thereby augmenting the authentication. The user must have access to the third device and the primary authentication information entered at the first device in order to complete the authentication.

The first unit includes a plurality of software routines. One routine may be configured as a user input handler that accepts user input through a GUI interface or other suitable interface and provides output to the user in the form of a display or audio signal. Another software routine serves as an authentication controller that coordinates the relaying of information between the primary controller and the user input handler. Another software routine serves as the primary channel controller such as a TCP/IP protocol stack used to communicate over the Internet to the second unit. The primary channel controller maintains two-way communication with another entity such as the second unit 302. Accordingly, the user input handler can be the conventional I/O capabilities of an Internet appliance or a laptop through a Web browser. The authentication controller may be a process or applet managing communication between the user input handler and any other components for the purposes of authenticating to the desired resource and may therefore interface, for example, with a cryptographic engine. The primary channel controller may be, for example, the TCP/IP protocol stack used to communicate over the Internet, or any other suitable communication controller and listened by may be for example a radio frequency transceiver to allow all of communications with the second unit. The second device as mentioned above, may be, for example, a Web server. The third device may be, for example, a paging device, PDA, or any other device that can provide visual or audible output to communicate the authentication code received from the second unit.

Authentication information may come from a server to a device or it may go directly from device to device. Where the cell phone has the capability to send the authentication data directly to a laptop computer via the bluetooth wireless protocol, the laptop computer automatically takes the authentication data and uses it for the purposes of two factor authentication. The fact that a phone was in range of the laptop computer confirmed that it was in fact the user at the keyboard trying to login.

Referring again to FIG. 4, a user 308 may use the first unit 300 to contact the second unit 302 via primary wireless channel 310 wherein the second unit 302 has access-controlled resources requiring authentication. The second unit 302 sends a primary authentication information request to the first unit to prompt the user to enter primary authentication information. The user enters a user ID to identify the user to the second unit 302 and sends the user ID back over the primary wireless channel. This is shown, for example, in steps 400 and 402. The second unit 302 contacts the authenticator 304 via a suitable communication link or bus, and passes the sent primary authentication information, namely the sent user ID, so that the authentication unit can determine if the user is listed in the authentication database 18. Accordingly, as shown in block 404, the method includes determining, based on a received user ID, which destination unit, other than the first unit 300, will receive an authentication code via the wireless back channel 312. The authentication code serves as secondary authentication information generated on an authentication session basis that is communicated via the wireless back channel to be used to authenticate the user. If the received user ID is listed in the database, the authentication unit retrieves the authentication record associated with the user. For example, this may include, for example, a user ID, SMS address, and other authentication information.

For example, if the user 308 has a GSM radiotelephone as the third unit 306, accessible via short messaging service, no other authentication data may be necessary. However, if the user has a pager, the pager network may require the entry of a password in addition to a user ID as part of the primary authentication information. The user in addition to entering the user ID, also enters a password that may be hashed by the first unit prior to communication to the second unit.

As shown in block 406, the method includes generating the authentication code to send to the third device during the same session. This is done, for example, by the authenticating code generator 28. The second unit sends a message over the primary channel 310 to the first device alerting the authentication controller to expect an authentication token message or authentication code. This causes a prompt for the authentication code to be displayed on the first device. The second unit sends a randomly generated, but locally stored authentication token or code to the third device via the alternate channel. This is shown in block 408. The third unit receives the authentication code via the back channel and displays it or otherwise transforms it for use or entry by the user into the first device. Accordingly, as shown in block 410, the user obtains the authentication code from the third unit and enters it into the first unit. The first unit returns the authentication code obtained as received by the third unit back to the second unit via the primary wireless channel as shown in block 412. The authenticator, as shown in block 414, authenticates the user using the returned authentication code that was sent via the primary channel with the authentication code sent via the back channel. If they correlate, the user is authenticated and proceeds to use the appropriate resources via the second unit 302. Accordingly, the method includes returning the authentication code on the wireless primary channel to the authentication unit during the same session. The authenticator will authenticate the user when the returned authentication code received from the wireless primary channel, matches the sent authentication code that was sent on the wireless back channel. The authentication code generator 28 generates the authentication code on a per authentication session basis and the second unit sends the authentication code on a per authentication basis after it is generated. The authentication unit maintains per user destination unit data including the destination unit identifier per user such as a telephone number IP address or any other suitable data in the authentication database. The primary authentication information, such as the user ID, as sent from the first unit, is used to determine which destination unit will receive the authentication code generated by the authentication code generator 309. The authentication code is then sent to the defined destination unit as defined by the device address in the database associated with the user ID.

As noted in the previous embodiment, the first unit may also include a cryptographic engine that allows the first unit to digitally sign information. Accordingly, the method may include, prior to returning the authentication code to the authentication unit, the first unit digitally signing the authentication code to be returned, to produce a digitally signed authentication code. The authentication unit 304 then can subsequently verify the digitally signed authentication code as part of authenticating the user. If the authentication of the digital signature does not work, access is denied since it implies that a rogue party attempted to digitally sign a recovered authentication code with an improper digital signature.

In another embodiment, the intermediate third unit automatically (e.g., transparent to the user) retransmits the authentication code to the first unit so that the user need not remember or enter the authentication code. Accordingly, the first unit includes a short range wireless transceiver. A second unit, such as a Web server, includes or is operatively coupled to an authentication unit. The intermediate third unit, such as a user's pager, radiotelephone, other computer, or any other suitable intermediate device also has a short range wireless transceiver. The first unit sends the primary authentication information via the primary channel during the session to the second unit. The second unit serving as the authenticator, uses the primary authentication information, and determines which intermediate destination unit, other than the first unit, will receive the authentication code as secondary authentication information via a first secondary channel.

The intermediate device that receives the authentication code retransmits the authentication code (or a variant thereof) transparently (i.e., without requiring a user to initiate the sending of the code) via a short range wireless communication link (i.e., a second secondary channel) to the first unit so that a user need not re-enter the authentication code. The first unit then resends the secondary authentication information back to the second unit via the primary channel. This may be transparent to the user or could require the user to signal the return of the code, for example by depressing a key or activating a GUI button or any suitable acknowledgement mechansism.

In one embodiment, the first unit provides an indication (visual or audible via a GUI or LED(s)) to the user when the code has been received from the intermediate device. Alternatively, or in addition, the intermediate device provides an indication (visual or audible) that the code was sent to the first unit.

Figure 5:
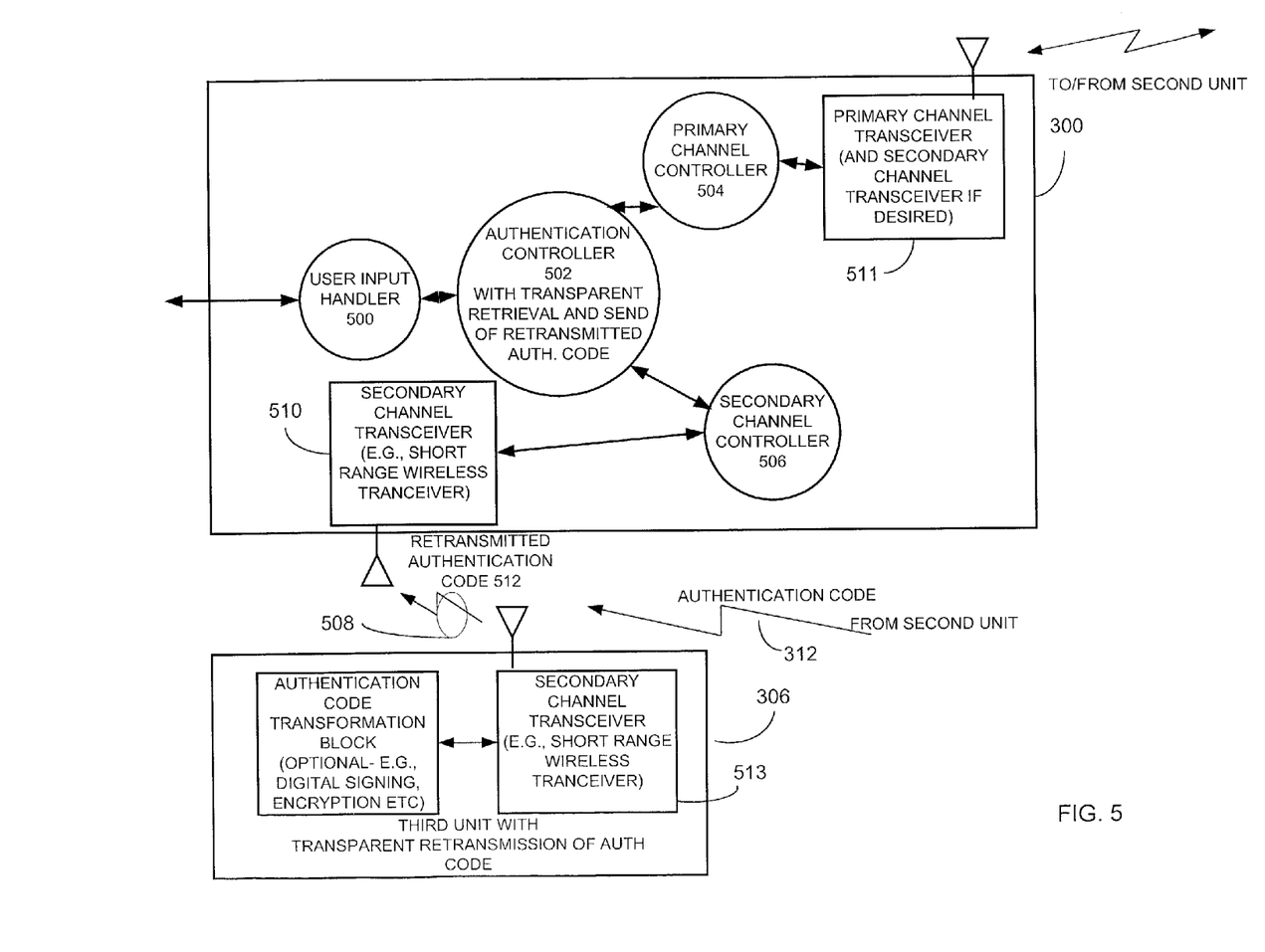
FIG. 5 is a block diagram illustrating one example of an apparatus for providing transparent user authentication using a third unit.

FIG. 5 illustrates one such example having a first device 300 which includes a processing device, such as a microcontroller, microprocessor, digital signal processor, discrete logic or any other suitable device or structure. In this example, the first device 300 includes a user input handler 500, an authentication controller 502, a primary channel controller 504 and a secondary channel controller 506. The user input handler 500 accepts user input, such as through a GUI interface or other suitable interface and provides output to the user in the form of a display or audio signal. The authentication controller 502 coordinates the relaying of information between the other components in order to manage the overall authentication process. The primary channel controller 504 maintains two-way communications with the second device. The secondary channel controller 506 maintains one way or two-way communications with the intermediate third device 306, such as a pager or cell phone.

In this embodiment, the first device 300 may be a Blue Tooth enabled personal computer or Internet appliance or any other suitable device with a short range wireless receiver used to provide another secondary channel with the third device. The device 300 receives retransmitted authentication information from the third unit. The user input handler 500 may be a conventional I/O interface, such as a Web browser.

The secondary channel controller 506 may be a software interface that interfaces with the short range wireless receiver (e.g., transceiver if two way communication is desired) which may utilize a Blue Tooth protocol stack used to communicate with the third unit 306. The second unit 302 may be a Web application server. The third device 306 may be any suitable device such as a Blue Tooth enabled device or radiotelephone supporting some type of instant messaging, for example, SMS short Message Service as described and used, for example, in a GSM cellular system. The third unit 306 is preferably the personal property of the user 308. The first unit 300 and third unit 306 also include short range wireless transceivers such as Blue Tooth enabled communication circuits to provide short range transparent communication of the authentication code (i.e., local area network communications).

It will be recognized that if desired, a suitable transformation may be applied to the authentication code by the third unit or any other suitable unit. For example, a hash function may be used, so long as the transformation is expected by the second device (as is the case with the authentication code being digitally signed as stated above).

The authentication controller 502, upon receiving data representing that the user wishes to access resources controlled by the second device, sends an activation command to the secondary channel controller and the primary channel controller so that each of the controllers can suitably set up the transceiver, e.g., tune respective transceivers and/or employ requisite CDMA codes or any other channel information required to send and/or receive data over the primary channel and over the second secondary channel 508. For example, since the user has indicated that it wishes to receive an authentication code, the authentication controller 502 suitably sets up the secondary channel controller to receive the authentication code from the third device when the third device sends it via the short range messaging. The authentication controller 502 may include a time out period during which time a reset condition will occur to request an authentication code again via the primary channel if the authentication code is not received via the second secondary channel within a fixed period of time.

Where the authentication database indicates multiple intermediate destination devices or alternate devices that can receive the authentication code, the authentication controller 502 may command the secondary channel controller 506 on a priority basis so that the secondary channel controller is expecting the authentication code from a particular device on a known frequency or using a known CDMA code. If the authentication controller does not receive the authentication code within a fixed period of time, the authentication controller 502 then controls the secondary channel controller 506 to an alternate frequency or code used by another potential destination device or address listed for the user in the authentication database. Other techniques will be apparent to those of ordinary skill in the art.

In one example, the user, for example, has a GSM radiotelephone enabled device as the third unit, accessible via SMS. In operation, the second unit sends a message over the primary channel to the first unit alerting the authentication controller 502 to expect an authentication token message via the secondary channel and can provide the requisite secondary channel tuning information or selection information, such as the necessary Walsh code or channel frequency, if desired, to allow the first unit to set up to receive the retransmitted authentication code. The authentication controller 502 contacts the third unit over the second secondary channel 508 to inform it to expect an authentication token via the first secondary channel using the secondary channel controller 506. The third unit receives the authentication token via the back channel (first secondary channel) and optionally transforms it and sends it to the first device via the second secondary channel. The first unit, via the authentication controller 502, receives the authentication token and controls the primary controller to forward the authentication token or code to the second unit over the primary channel. This is done in a way that is transparent to the user so that the user need not enter confirmation information or re-enter the authentication code. Accordingly, the authentication code can be passed directly to the primary channel controller without being displayed or otherwise provided to the user via the user input handler 500.

The third unit therefore uses for example a long range wireless transceiver to receive from the authentication unit, via the secondary channel, the authentication code for the first unit. The third unit uses the short range wireless transceiver for re-transmitting the authentication code to the first unit via a different secondary channel in a way that is transparent to a user of the first unit. As noted above, the third unit includes, if desired a transformation circuit, such as a cryptographic engine, that transforms the authentication code prior to re-transmitting via the second secondary channel.

Once the second unit receives the authentication token over the primary channel, it determines whether the code (authentication token) is suitable. For example, it compares it to what it sent to the third unit via the secondary channel, taking into account any transformations which might have occurred via the third unit. If the authentication token or code sent to the third unit correlates to what was received from the first unit, the user is authenticated and proceeds to use the appropriate resources that are accessible via the second unit.

It will be recognized that the primary channel controller 504 and the secondary channel controller 506 may be any suitable hardware or software interfaces suitable to control the primary and secondary channel receivers, transmitters and/or transceivers.

Figure 6:
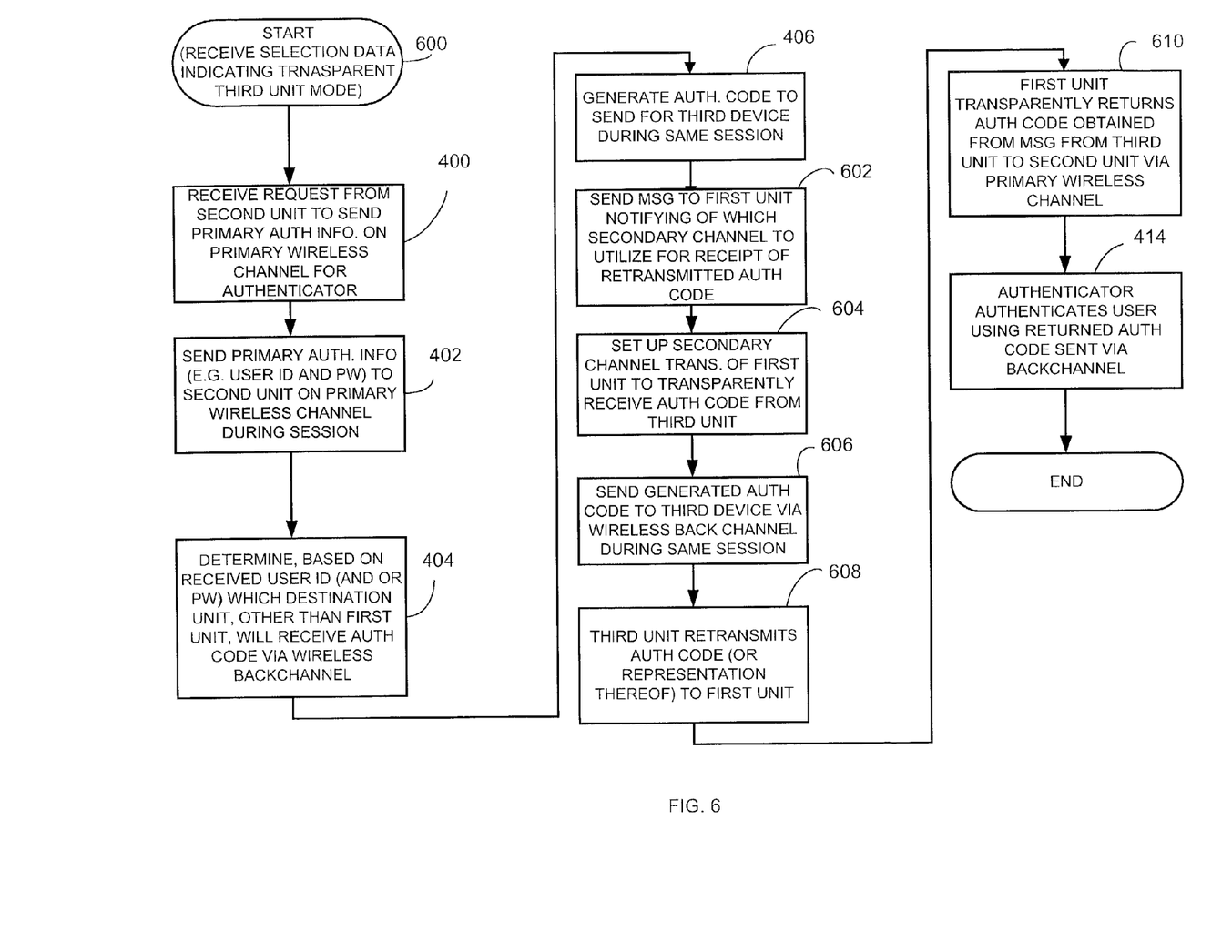
FIG. 6 is a flow chart illustrating one example for a method for providing user authentication in a manner transparent to a user using a third device in accordance with one embodiment of the invention.

In another embodiment, as shown in FIG. 6, upon power up of the first device or at any other suitable time, the user input handler 500 presents a user input interface such as a GUI interface with a selection button or menu allowing the user to select a transparent authentication mode with a third communication unit. When this mode is selected, the operations described above and/or below with respect to FIG. 6 are carried out. As shown in block 600 of FIG. 6, the method includes, providing selection of a third unit (intermediate destination unit) transparent authentication code submission scheme by, for example, providing a GUI button or other selection mechanism to allow a user to select the operation of the transparent authentication mode wherein the authentication code is retransmitted transparently by the third unit to the first unit and wherein the first unit transparently communicates the authentication code to the second unit. The authentication controller selects the third unit transparent authentication code scheme in response to receiving the selection data and activates the secondary channel controller 506. As shown in FIG. 6, the steps of 400 through 406 are again carried out (see FIG. 4). However, since the transparent authentication code submission scheme has been selected, the system provides for retransmitting of the authentication code by the intermediate destination unit to the first unit via a second secondary channel indicated generally as 508 in FIG. 5. This is a short range communication link set up between the third unit 306 and the first unit 300. Setting up of the link may be done in any conventional manner. However, in order for the secondary channel controller 506 to know which secondary channel transceiver 510 or which code or channel the secondary channel transceiver should be set to, the method includes the second unit sending a message notifying which secondary channel to utilize for receipt of the retransmitted authentication code. As shown in block 604, the secondary channel controller 506 sets up the secondary channel transceiver 510 to transparently receive the authentication code that is retransmitted from the third unit. As shown in step 606, the method includes sending, by the second unit, the generated authentication code to the intermediate destination unit 306 via the wireless back channel (first secondary channel) during the same session. As shown in block 608, the intermediate destination unit 306 retransmits the received authentication code 512 to the first unit in a way that is transparent to the user of the first unit. For example, since the secondary channel controller 506 has set up the secondary channel transceiver 510 to receive a short range communication on the requisite channel, it waits to receive the retransmitted authentication code 512 from the third unit. In response to receiving the retransmitted authentication code from the intermediate destination unit, the first unit returns the authentication code to the authentication unit in a way that is transparent to the user of the first unit. This may be done, for example, by simply communicating the retransmitted authentication code 512 from the secondary channel transceiver 510 to the primary channel transceiver 511 of the first unit. The primary channel transceiver then returns the authentication code obtained from the third unit via the primary wireless channel, as shown in block 610.

The short range transceivers 510 and 513, as described herein, may, for example, send data in a range of approximately 100 meters. However, it will be recognized that any suitable short range transceivers may be utilized.

In another embodiment, when the second device sends the authentication code to the destination address, it does not know whether the authentication code will be sent back to the same device (i.e. first device) that the user has established their primary channel with or to another device (i.e. a third device). Therefore, in one embodiment, the authentication code is sent back on an alternate channel to the first unit during the same session and displayed to the user, by email or in any other suitable manner. This authentication code is then automatically copied by the authentication controller 502 over to a GUI window for the primary channel that is waiting for the authentication code to be entered. The primary channel controller then sends the copied authentication code to the second unit.

The above operations may be implemented by one or more processing devices that execute instructions stored in a storage medium or any suitable structure as desired. A storage medium may include, for example, one or more remotely accessible database via the Internet, a hard drive, RAM, ROM, CD ROMs, diskettes, or any other suitable storage medium containing executable instructions that when executed by one or more processors causes the one or more processors to carry out one or more of the above operations. For example, the storage medium may contain executable instructions that cause the authentication unit to receive, from the first unit, user identification data, that causes, for example, a processor associated with an authentication unit to use the user identification data to determine which destination unit, other than the first unit, will receive an authentication code to be used to authenticate the user. The storage medium may contain executable instructions that when executed by one or more processors causes one or more processors associated with authentication unit or other unit to send the authentication code to the determined destination unit based on the user identification data and to subsequently receive a returned authentication code back after sending the authentication code and authenticate the user, based on the returned authentication code when the returned authentication code matches the sent authentication code.

Accordingly, the above methods and apparatus allow differing levels of authentication. Moreover, an alternate channel is used during the session to provide authentication information in addition to user ID and/or a password to provide multi-factor authentication. In addition, sending the authentication code to a third unit that is owned by the user, improves the authentication process since only the user owns the third device and since the access cannot be granted without the party having access to both the first unit and the first unit. Other advantages will be recognized by those of ordinary skill in the art.

It should be understood that the implementation of other variations and modifications of the invention in its various aspects will be apparent to those of ordinary skill in the art, and that the invention is not limited by the specific embodiments described. For example, although an embodiment has been described that uses a password as the example of the primary authentication mechanism it will be recognized that any primary authentication mechanism (as known in the art) as being used, e.g. biometric, such as voice recognition, or digital signature, given that the primary device contains a private signature key. Also, the database for the primary authentication information (e.g. password) may be different than the database for the destination unit data. The preferred embodiment should include them in the same database, but it may also be desirable to separate their storage. It is therefore contemplated to cover by the present invention, any and all modifications, variations, or equivalents that fall within the spirit and scope of the basic underlying principles disclosed and claimed herein.

What is claimed is:

1. A method for providing user authentication comprising:
   (a) sending, by a first unit, user identification data to an authentication unit;
   (b) using the user identification data to determine which intermediate destination unit will receive an authentication code to be used to authenticate the user;
   (c) sending the authentication code to the determined intermediate destination unit based on the user identification data via a first secondary channel;
   (d) re-transmitting, by the intermediate destination unit, the authentication code to the first unit via a second secondary channel in a way that is transparent to the user;
   (e) in response to receiving the re-transmitted authentication code from the intermediate destination unit, returning the authentication code to the authentication unit; and
   (f) authenticating the user when the returned authentication code is determined to be suitable.

2. The method of claim 1 including the step of providing selection of a third unit transparent authentication code submission scheme and selecting the third unit transparent authentication code scheme in response to receiving selection data.

3. The method of claim 1 including the step of maintaining per user destination unit data including at least one destination unit identifier per user and wherein the step of using the user identification data to determine which destination unit will receive the authentication code includes sending the authentication code to the determined intermediate destination unit based on the stored per user destination unit identifier.

4. The method of claim 1 wherein the second secondary channel is short range channel and including the step of notifying, by the second unit, the first unit of a short range secondary channel used to receive the retransmitted authentication code from the third unit.

5. The method of claim 1 including the steps of:
   prior to returning the authentication code to the authentication unit, digitally signing, by the first unit, the returned authentication code to produce a digitally signed authentication code that was received from the determined destination unit; and verifying the digitally signed authentication code as part of step (f).

6. A storage medium comprising:
memory containing executable instructions that when executed by one or more processors, causes the one or more processors to:
send, by a first unit, user identification data to an authentication unit;
use the user identification data to determine which intermediate destination unit will receive an authentication code to be used to authenticate the user;
send the authentication code to the determined intermediate destination unit based on the user identification data via a first secondary channel;
re-transmit, by the intermediate destination unit, the authentication code to the first unit via a second secondary channel in a way that is transparent to the user;
in response to receiving the re-transmitted authentication code from the intermediate destination unit, return the authentication code to the authentication unit; and
authenticate the user when the returned authentication code is determined to be suitable.

7. The storage medium of claim 6 including memory containing instructions that when executed by one or more processors, causes the one or more processors to provide selection of a third unit transparent authentication code submission scheme and selecting the third unit transparent authentication code scheme in response to receiving selection data.

8. The storage medium of claim 6 wherein the second secondary channel is short range channel and including memory containing instructions that when executed by one or more processors, causes the one or more processors to notify, by the second unit, the first unit of a short range secondary channel used to receive the retransmitted authentication code from the third unit.

9. A system for providing user authentication comprising:
a first unit;
a second unit operatively coupleable to the first unit via a primary wireless channel and operatively coupleable to an authenticator; and
a third unit, operatively coupleable to the second unit via a wireless back channel and operatively coupleable to the first unit via a secondary short range channel,
the first unit operative to send primary authentication information via the primary channel during a session to the second unit;
the authenticator operative to use the primary authentication information to determine which destination unit, other than the first unit, will receive an authentication code as secondary authentication information via the wireless back channel and wherein the destination unit is the third unit;
the second unit operative to the send the authentication code on the wireless back channel to the destination unit based on the primary authentication information sent via the primary channel during the same session;
the destination unit operative to re-transmit the authentication code to the first unit via a second secondary channel in a way that is transparent to a user of the first unit;
the first unit operative to return the authentication code on the wireless primary channel to the second unit during the same session; and
the authenticator operative to authenticate the user when the returned authentication code received from the wireless primary channel is determined to be suitable.

10. The system of claim 9 wherein the authenticator maintains per user destination unit data including at least one destination unit identifier per user and sends the authentication code to the second unit for transmission to the destination unit based on the stored per user destination unit identifier.

11. The system of claim 9 wherein the first unit includes a cryptographic engine and prior to the first unit returning the authentication code for the authenticator, digital signs the returned authentication code to produce a digitally signed authentication code that was received from the third unit; and wherein the authenticator verifies the digitally signed authentication code as part of authenticating the user.

* * * * *